MAGNETIC PICKUP HEAD AND MOUNT THEREFOR

Filed Aug. 30, 1947 2 SHEETS—SHEET 1

Inventor
MARVIN CAMRAS
by The Firm of Charles W. Hills Attys.

Inventor
Marvin Camras
The Firm of Charles W. Hills
Attys.

Patented Feb. 19, 1952 2,585,913

UNITED STATES PATENT OFFICE 2,585,913

MAGNETIC PICKUP HEAD AND MOUNT THEREFOR

Marvin Camras, Chicago, Ill., assignor to Armour Research Foundation of Illinois Institute of Technology, Chicago, Ill., a corporation of Illinois Application August 30, 1947, Serial No. 771,493

13 Claims. (Cl. 179—100.2)

This invention relates to a magnetic sound head and mounting therefor, and more particularly, to a magnetic sound head which is especially adapted for use on moving picture projectors.

The use of a magnetic sound track on a moving picture film has been known for some time, and many suggestions have been made as to how it might be used in a motion picture projector so that the sound to accompany the moving picture might be reproduced from a magnetic sound track rather than from an optic sound track as is the common practice of the present day.

While many suggestions have been made, none of the known systems to date have been practical commercially. One of the chief complications of using a magnetic sound track on a motion picture film has been the design of a suitable head for use in conjunction with the magnetic sound track on the film. A further difficulty in the past has been the fact that the film easily changes its physical dimensions and accordingly, it has been rather difficult to obtain even reasonably good quality with any magnetic record on a motion picture film.

One of the principal features and objects of the present invention is to provide a novel magnetic sound head and mounting therefor which is particularly adapted and suited for use on a moving picture projector.

A further object of the present invention is to provide a novel mounting for an electromagnetic transducer head.

Another object of the present invention is to provide a novel electromagnetic transducer head which acts only on a portion of the transverse section of the sound track of a moving picture film or other carrier and which has novel means for so locating the head with respect to the magnetic track.

A further object of my invention is to provide a novel moving picture film.

Another and still further object of the present invention is to provide a novel method and means for making a recording on and reproducing a magnetic record on and from a moving picture film.

Another and still further object of the present invention is to provide a novel magnetic sound pick-up arrangement which is extremely small in construction, which is highly efficient in operration, and which is particularly effective when employed in conjunction with 8 mm. and 16 mm. moving picture film.

The novel features which I believe to be characteristic of my invention are set forth with particularity in the appended claims. My invention itself, however, both as to its organization, method of operation, and manner of construction, together with further objects and advantages thereof may best be understood by reference to the accompanying drawings, in which:

Figures 8, 9:
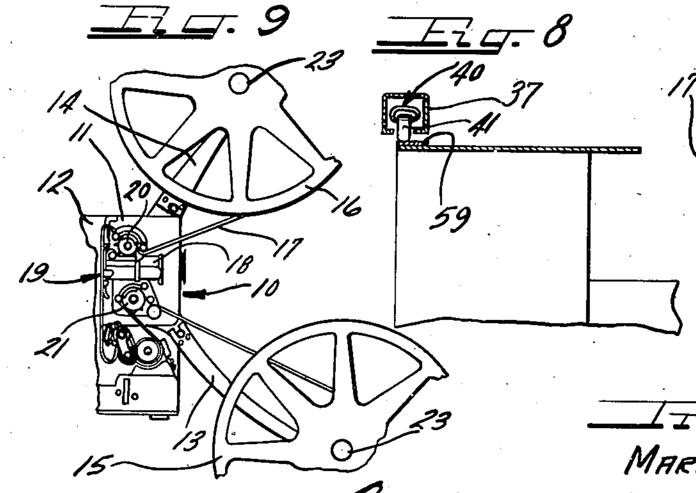
Figure 8 is another view similar to Figure 6 but illustrating a third embodiment of my magnetic sound head.
Figure 9 is an outline view of a projector such, for example, as a 16 mm. sound projector, an enlarged fragmentary portion of which is illustrated in Figure 1.

The sound moving picture projector 10 illustrated in Figure 9 of the drawings includes a main housing 11 which includes the motor for driving the various movable mechanical elements of the system, the audio amplifier for the sound system, and other conventional parts of a moving picture projector.

The housing 11 also includes a supplemental housing 12 which contains the projection lamp. Mounted on the forward part of the housing 11 are a pair of removable reel arms 13 and 14 which carry a pair of reels 15 and 16 between which a film 17 is arranged to be transferred.

The projector 10 includes, of course, the lens system 18, the gate mechanism 19, and a pair of sprocket wheels 20 and 21. The spindles 22 and 23 upon which the reels 15 and 16 are mounted are arranged to be driven through endless loop drive members (not shown) mounted within the arms 13 and 14, respectively.

Figure 1:
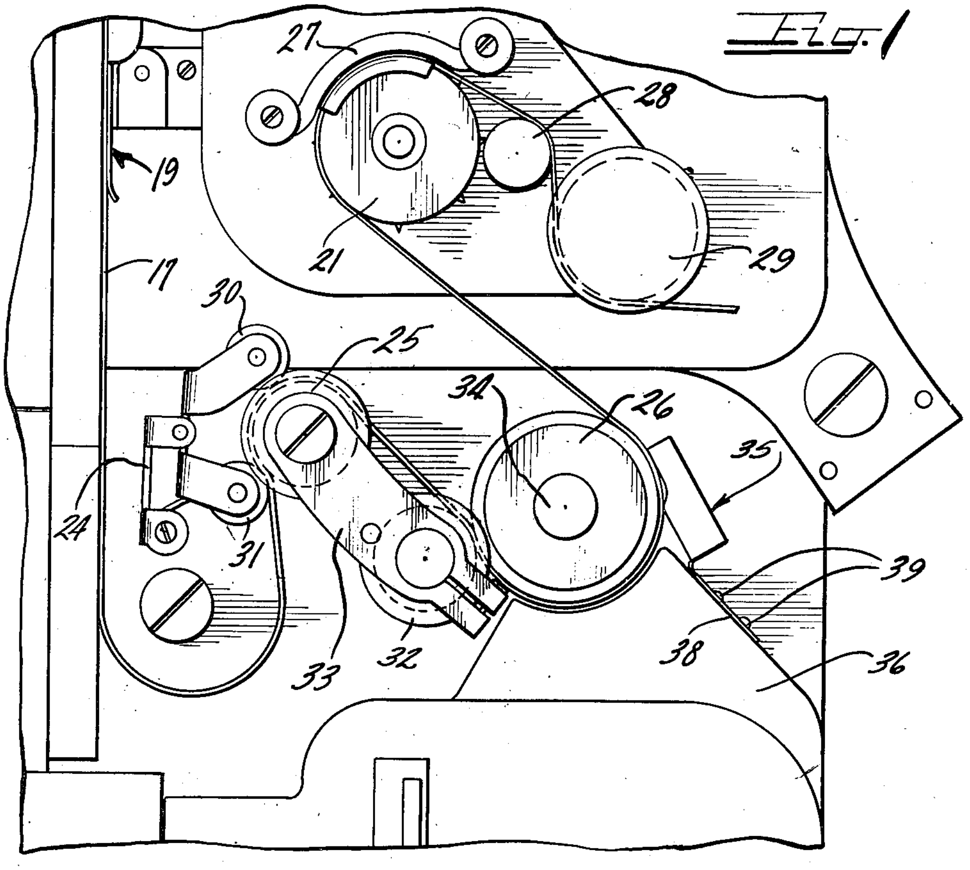
Figure 1 is a fragmentary elevational view of a portion of a moving picture projector in the region of the conventional gate mechanism and sprocket drive.

Referring now particularly to Figure 1 of the drawings, it will be observed that after the film 17 leaves the gate mechanism 19, it passes down behind a bracket 24, then around back in an open loop up over a roller 25 around a rotary stabilizer roller or capstan 26, then up over the lower sprocket 21 where it is held in place by a shoe 27, then back over a stripper post 28, finally down around a guide roller 29 and on out to the lower reel 16.

The film in passing over the roller 25 is held in place by two small rollers 30 and 31. The film 17 in passing over the rotary stabilizer capstan 26 is held in place by a tension or pinch roller 32 which is carried on the arm 33 hinged about the axis of rotation of the roller 25. The tension roller 32 is spring-biased (not shown) in a counter-clockwise direction about its pivot point, thereby to cause the tension roller 32 to be constantly urged against the rotary stabilizer 26.

The rotary stabilizer element 26 is mounted on a shaft 34 and is either of substantial mass itself, thereby to act as an inertia member, or else has an additional inertia member (not shown) mounted on the shaft 34 within the housing 11. The shaft 34 is driven by the pull of the film 17 thereover at constant speed, the film 17 itself being driven by sprocket wheel 21. As will now be explained, the magnetic sound head engages the sound track of the film 17 as it passes over the rotary stabilizing element or capstan 26. This insures substantially constant linear speed of the film sound track as it passes the recording and reproducing head.

As may be seen best in Figure 1 of the drawings, the sound head assembly 35 is mounted on a shoulder formation 36 which lies below the rotary stabilizing element 26.

Figure 2:
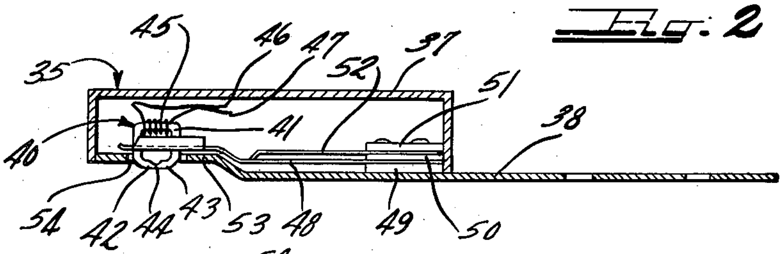
Figure 2 is an enlarged sectional view of the magnetic recording head and mounting as taken along the line II—II of Figure 3.
Figure 3:
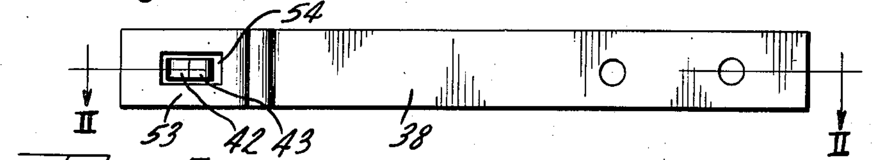
Figure 3 is a bottom view of the magnetic sound head assembly.

As may be seen best in Figures 2 and 3 of the drawings, the sound head assembly 35 includes a housing 37 which is mounted on an arm 38 bolted or riveted as at 39 to the shoulder formation 36 of the housing. The housing 37 of the sound head assembly and the arm 38 are preferably made of steel or other suitable magnetic material so as to act as a magnetic shield for the head 40 which is mounted within the housing 37. The head 40 includes a core member 41 having two confronting leg portions 42 and 43 which terminate in closely spaced confronting relationship to each other to define a gap 44. A signal coil 45 is wound on the core 41 and connects through leads 46 and 47 to the amplifier (not shown).

The head 40 is mounted on a long flat leaf spring 48 which is supported at one end between insulating blocks 49 and 50. A third insulating block 51 also holds in place a second leaf spring element 52 which bears against the spring 48 and tends to damp the vibration thereof when the sound head 40 is suddenly displaced by any irregularity in the film 17 passing therebeneath.

The lower side of the housing 37 is, of course, covered by the mounting plate 38 and includes an off-set portion 53 which is provided with an opening 54 through which a small portion only of the core 41 of the head 40 projects.

As may be seen best in Figure 3 of the drawings, the opening 54 is only slightly larger than the leg portions 42 and 43 of the core 41 which projects therethrough. It will thus be seen that the head on its leaf spring or cantilever spring mounting 48 is free for limited movement but is prevented from damage from sudden blows, since the head 40 is protected from top blows, side blows, and end blows by the housing 37 and bottom blows are restrained by the member 38 after relatively small movement of the head 40. It will further be observed that the head 40 is magnetically shielded by the housing 37 from stray magnetic fields such as might be present from the drive motor of the projector unit.

Figure 4:
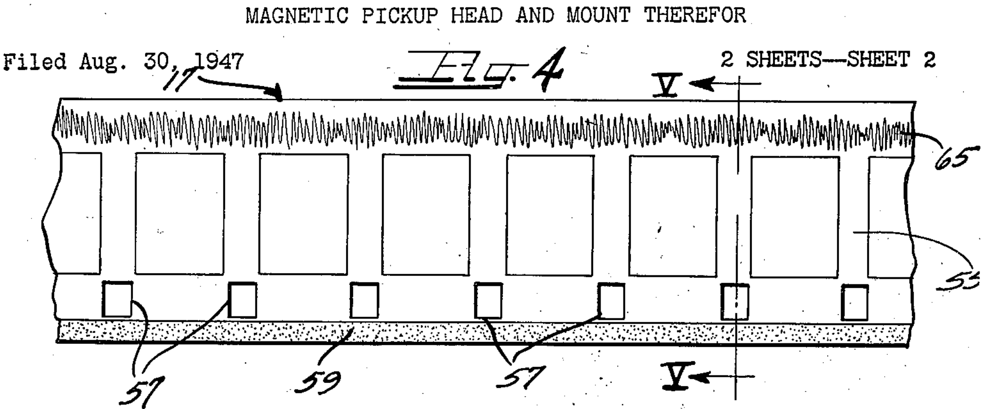
Figure 4 is an enlarged fragmentary view of a moving picture film of the 16 mm. optical sound track type with an additional magnetic sound track added thereto.
Figure 5:
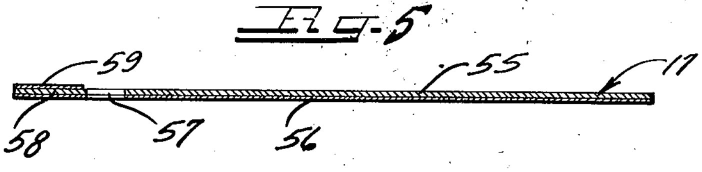
Figure 5 is a still further enlarged sectional view of the film as taken along the line V—V of Figure 4.

The pole portions 42 and 43 are slightly concave over their lower surfaces so as to conform to the curvature of the cylindrical surface of the rotary stabilizing element 26. The moving picture film used in the projector as just described is illustrated in Figures 4 and 5 of the drawings.

The film 17 includes a main base portion 55 which may conveniently be of a cellulose acetate or cellulose nitrate form and is covered with an emulsion 56.

A row of sprocket holes 57 extend along one edge of the film 17 with a relatively small marginal portion left between the sprocket holes 57 and the actual edge of the film 17. Along this marginal portion 58 is a magnetic sound track 59 which may conveniently be in the form of a coating of ferromagnetic powdered material bonded to the opposite side of the base portion 55 of the film 17 from that which carries the emulsion 56.

As illustrated in the drawings, the film is of the conventional 16 mm. sound film variety, or in other words, a film in which there is only one row of sprocket holes, the opposite marginal edge of the film being the one which ordinarily has an optic sound track 65 thereon.

Figures 6, 6A:
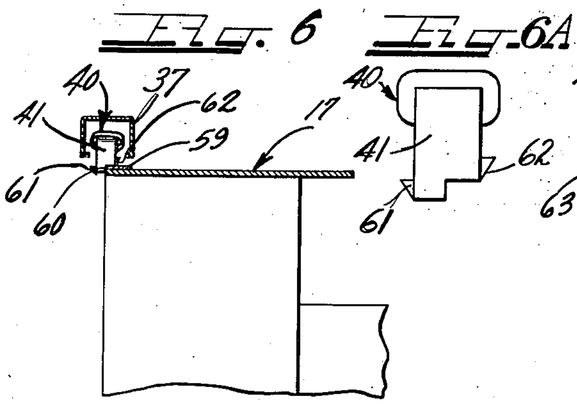
Figure 6 is an enlarged fragmentary view of the rotary stabilizer and sound head.
Figure 6A is an enlarged view of the transducer head shown in Figure 6.

The sound head 40 which is arranged to cooperate with the magnetic sound track 59 has a step-shape undersurface (see Figure 6) which aligns the sound head 40 with the sound track 59 on the film 17. It has been found in actual practice that much better results are obtained when a head is employed which does not cover the entire width of the magnetic track 59, but only covers a portion thereof on one side or the other. In this connection, it has been found that such results are better than when a head smaller than the width of the magnetic track is disposed centrally of the magnetic track. To this end, the step-shape formation indicated at 60 confines the pole portions 42 and 43 of the core 41 to one marginal portion of the magnetic track 59. The depending shoulder 60 which overhangs the edge of the film 17 including the sound track 59 conveniently confines the head 40 to a uniform path of travel along the magnetic track 59.

A pair of non-magnetic wings 61 and 62 mounted on the sides of the core 41 below the supporting bracket 38 having cam surfaces thereon arranged to guide the film below the sound head 40, so that the film 17 slips into proper place with relation to the shoulder 60.

Figure 7:
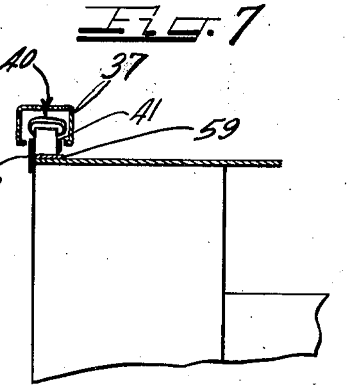
Figure 7 is a fragmentary view similar to Figure 6 illustrating a modified form of magnetic sound head.

A modified form of sound head arrangement is shown in Figure 7 of the drawings wherein the core 41 of the sound head 40 does not actually have a step-shape formation but rather is provided with a shoulder of non-magnetic material 63 which depends to a position slightly below the core 41 to confine the core 41 to one side of the magnetic track 59.

A third form of the invention is shown in Figure 8 of the drawings wherein the core 41 of the sound head 40 is made at least half as small as the width of the magnetic track 59. Particularly good results have been found with a head of this character, especially when care is taken in placing the film beneath the head 40 so that the head is disposed in the position as shown in Figure 8 with respect to the magnetic track 59.

Figure 10:
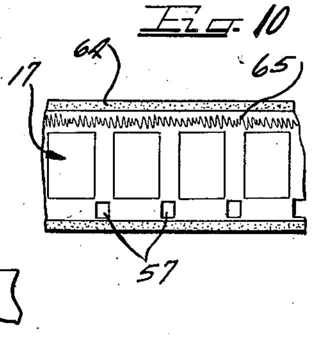
Figure 10 is a fragmentary view of a modified form of film.

Figure 10 illustrates a modified form of film 17 wherein a magnetic sound track 64 is provided along the edge opposite the sprocket holes 57. This may be used in addition to the magnetic sound track 59 and the optic sound track 65, or may be used alone.

It is advantageous to have the magnetic sound track 64 along the edge of the film 17 opposite the edge adjacent the sprocket holes 57 because it is not then subjected to mechanical distortion by the sprocket hole punchings or by wear and tear of the film at the sprocket holes.

While I have shown several embodiments of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. A magnetic sound head assembly comprising a housing for a magnetic sound head, a sound head having a pair of magnetic poles projecting through said housing, a tape-supporting member, a resilient mounting for said sound head biasing said head toward said supporting member, and means including a cam on said head for raising said head to enable said tape record member to be slipped between said supporting member and said head when said tape record member is slid laterally over said supporting member.

2. A magnetic sound head assembly comprising a housing, a sound head having a pair of magnetic poles projecting through said housing, a tape-supporting member, a resilient mounting for said sound head biasing said head toward said supporting member, and means including a cam on said head for raising said head to enable said tape member to be slipped between said supporting member and said head when said tape member is slid laterally over said supporting member, said head having a stop thereon for limiting the extent to which the tape record member may be slipped under said head.

3. A magnetic sound head assembly comprising a housing, a sound head having a pair of magnetic poles projecting through said housing, a tape-supporting member, a resilient mounting for said sound head biasing said head toward said supporting member, and means including a cam on said head for raising said head to enable said tape record member to be slipped between said supporting member and said head when said tape record member is slid over said supporting member, said head having an integral shoulder thereon for limiting the extent to which the tape record member may be slipped under said head.

4. A magnetic sound head assembly comprising a housing, a sound head having a pair of magnetic poles projecting through said housing, a tape-supporting member, a resilient mounting means for said sound head biasing said head toward said supporting member, and means including a cam carried by said head for raising said head to enable said tape record member to be slipped between said supporting member and said head when said tape member is slid sideways over said supporting member, said head having a non-magnetic stop on one side thereof for engaging one edge of said tape.

5. A magnetic sound head assembly comprising a housing, a magnetic sound head having a pair of magnetic poles projecting through said housing, a tape-supporting member, a resilient mounting for said sound head biasing said head toward said supporting member, and means including a cam on said head for raising said head to enable said tape record member to be slipped between said supporting member and said head when said tape record member is slid over said supporting member, said head having a non-magnetic stop on one side thereof for engaging one edge of said tape.

6. A magnetic sound head assembly comprising a housing, a sound head having a pair of magnetic poles projecting through said housing, a tape-supporting member, a resilient mounting for said sound head biasing said head toward said supporting member, and means including a pair of cam surfaces disposed on opposite lateral sides of said head to enable said tape record member to be slipped from either side of said head into a position between said supporting member and said head.

7. A magnetic sound head assembly comprising a rigid support including a rigid sound head housing, said housing having an opening therein, a sound head resiliently mounted within said housing and having a pair of poles partially projecting through the opening in said housing, the clearances between said partially projecting poles and said opening being relatively small, whereby said housing resists side thrusts on said poles.

8. A magnetic sound head assembly comprising a rigid support including a rigid sound head housing, said housing having an opening therein, a sound head disposed within said housing and having a pair of poles partially projecting through the opening in said housing, said head being mounted on the free end of a leaf spring, said leaf spring being secured and supported at its opposite end to said support.

9. A magnetic sound head assembly comprising a rigid support including a rigid sound head housing, said housing having an opening therein, a sound head disposed within said housing and having a pair of poles partially projecting through the opening in said housing, said head being mounted on the free end of a leaf spring, said leaf spring being secured and supported at its opposite end to said support, and dampening means engaging said spring.

10. A magnetic sound head assembly comprising a rigid support including a rigid sound head housing, said housing having an opening therein, a sound head disposed within said housing and having a pair of poles partially projecting through the opening in said housing, said head being mounted on the free end of a leaf spring, said leaf spring being secured and supported at its opposite end to said support at a point lower than the point of attachment of said leaf spring to the side of said pole portions which project through said opening.

11. A magnetic sound head assembly comprising a rigid support including a rigid sound head housing, said housing having an opening therein, a sound head disposed within said housing and having a pair of holes partially projecting through the opening in said housing, said head being mounted on the free end of a leaf spring, said leaf spring being secured and supported at its opposite end to said support, the clearances between said partially projecting poles and said opening being relatively small, whereby said housing resists side thrusts on said poles.

12. A magnetic sound head assembly comprising a rigid support including a rigid sound head housing, said housing having an opening therein, a sound head disposed within said housing and having a pair of poles partially projecting through the opening in said housing, said head being mounted on the free end of a leaf spring, said leaf spring being secured and supported at its opposite end to said support, and dampening means engaging said spring, the clearances between said partially projecting poles and said opening being relatively small, whereby said housing resists side thrusts on said poles.

13. A magnetic sound head assembly comprising a rigid support including a rigid sound head housing forming a magnetic shield, said housing having an opening therein, a sound head resiliently mounted within said housing and having a pair of poles partially projecting through the opening in said housing, the clearances between said partially projecting poles and said opening being relatively small, whereby said housing resists side thrusts on said poles.

MARVIN CAMRAS.

REFERENCES CITED

The following references are of record in the file of this patent:

UNITED STATES PATENTS

| Number | Name | Date |
|---|---|---|
| 873,084 | Poulsen | Dec. 10, 1907 |
| 897,765 | Morin | Sept. 1, 1908 |
| 1,897,722 | Dahmen | Feb. 14, 1933 |
| 2,383,994 | Smith | Sept. 4, 1945 |
| 2,418,543 | Camros | Apr. 8, 1947 |

FOREIGN PATENTS

| Number | Country | Date |
|---|---|---|
| 69,273 | Norway | May 28, 1945 |
| 617,796 | Germany | Aug. 28, 1935 |
| 884,881 | France | May 19, 1943 |